United States Patent
Smetana

(10) Patent No.: US 8,365,891 B2
(45) Date of Patent: Feb. 5, 2013

(54) OVERRUNNING CLUTCH HAVING A DAMPING DEVICE

(75) Inventor: Tomas Smetana, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 532 days.

(21) Appl. No.: 12/607,490

(22) Filed: Oct. 28, 2009

(65) Prior Publication Data

US 2010/0101911 A1  Apr. 29, 2010

(30) Foreign Application Priority Data

Oct. 29, 2008 (DE) .................. 10 2008 053 616

(51) Int. Cl.
*F16D 11/00* (2006.01)

(52) U.S. Cl. ................................................ 192/46
(58) Field of Classification Search ............. 192/46, 192/41 R, 45.1, 55.3, 55.62; 60/345
See application file for complete search history.

(56) References Cited

U.S. PATENT DOCUMENTS

| 6,386,065 B1 * | 5/2002 | Hodjat ........................ 74/574.4 |
| 6,830,138 B2 | 12/2004 | Muramatsu |
| 7,896,144 B2 * | 3/2011 | Brees ............................ 192/46 |
| 2003/0146063 A1 | 8/2003 | Yamada |
| 2004/0026200 A1 | 2/2004 | Muramatsu |
| 2007/0045076 A1 * | 3/2007 | Brees et al. ..................... 192/46 |

FOREIGN PATENT DOCUMENTS

| DE | 10017 744 A1 | 10/2001 |
| DE | 696 15 467 T2 | 5/2002 |
| DE | 10 2007 029 812 A1 | 1/2009 |
| DE | 102007029812 | * 1/2009 |

\* cited by examiner

*Primary Examiner* — David D Le
*Assistant Examiner* — Stacey Fluhart
(74) *Attorney, Agent, or Firm* — Lucas & Mercanti, LLP; Klaus P. Stoffel

(57) ABSTRACT

A positively locking overrunning clutch, which has a damping device, a drive input element and a drive output element and also at least one blocking element which blocks a rotation of the drive output element relative to the drive input element in a first rotational direction and enables the rotation in the opposite rotational direction. The blocking element has two clamping rings which are pivotable relative to one another and damped with respect to one another.

10 Claims, 3 Drawing Sheets

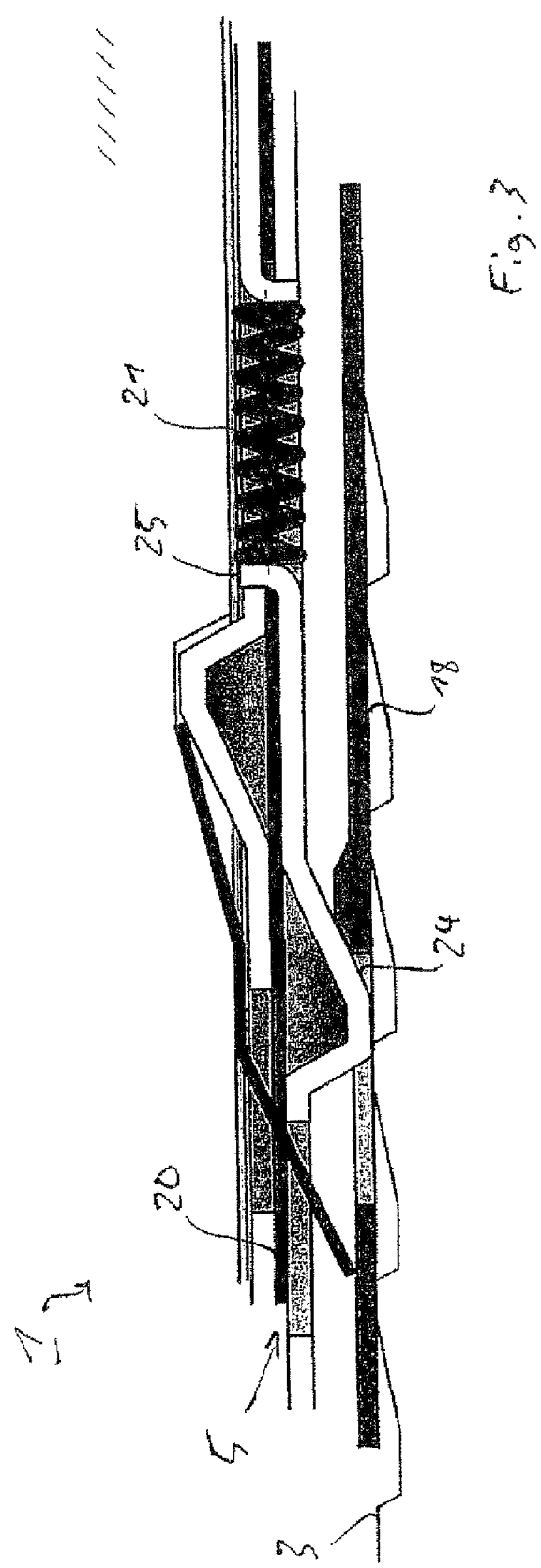

OVERRUNNING CLUTCH HAVING A DAMPING DEVICE

This application claims the priority of DE 10 2008 053 616.4 filed Oct. 29, 2008, which is incorporated by reference herein.

FIELD OF THE INVENTION

The invention relates to a positively locking overrunning clutch having a damping device.

BACKGROUND OF THE INVENTION

A positively locking overrunning clutch, specifically a pawl freewheel, having a damping mechanism is known for example from U.S. Pat. No. 6,830,138 B2. Said overrunning clutch is intended for installation into a torque converter. The damping mechanism is provided by an annular friction element.

OBJECT OF THE INVENTION

The invention is based on the object of specifying a positively locking overrunning clutch which has damping and which is of particularly space-saving design.

SUMMARY OF THE INVENTION

The object is achieved, according to the invention, by an overrunning clutch described herein. The overrunning clutch has a blocking element which blocks a rotation of a drive output element relative to a drive input element in a first rotational direction and enables said rotation in the opposite rotational direction. The blocking element is composed of two clamping rings which are pivotable relative to one another and damped with respect to one another.

The two-part blocking element therefore performs a dual function, specifically firstly the positively locking transmission of a torque between the drive input element and the drive output element, and secondly a damping function by means of which the torque peaks, which occur when the overrunning clutch is locked, are reduced. The expressions "drive input element" and "drive output element" are selected in order to provide a linguistic distinction, and are not an implied statement as to which of said elements transmits drive power to the other element, or which of the elements is supported on the other element. At least one of the elements of drive input element and drive output element is rotatable.

In a preferred embodiment, at least one spring element acts between the drive input element and the drive output element, said spring element being designed, for example, as a helical spring which is aligned in the tangential direction in relation to the axis of rotation or symmetry of the drive input element and of the drive output element. Other designs of torsion or spiral springs, for example leaf springs, are also suitable for enabling a resiliently elastic pivoting movement of the drive input element relative to the drive output element.

The two clamping rings preferably have inner sides which face toward one another and between which frictional contact is generated. Here, the outer sides, which face away from the inner sides, of the clamping rings are structured in such a way as to interact in a positively locking manner with latching structures of the drive input element and of the drive output element, respectively. Here, blocking surfaces which are aligned obliquely relative to the rotational axis of the drive input element and of the drive output element are preferably formed on the outer sides of the clamping rings, which blocking surfaces are provided to come into contact with corresponding blocking surfaces of the drive input and drive output element, respectively. The oblique alignment of the blocking surfaces relative to the rotational axis ensures that both axial and radial forces are transmitted between the clamping rings. A surface normal of a blocking surface preferably encloses an angle of more than 60° and less than 80° with the rotational axis. The expressions "axial" and "radial" always refer to the rotational axis of the drive input element and of the drive output element. The expression "rotational axis" is also used in cases in which one of the elements of drive input element and drive output element is arranged so as to be fixed and serves to support the other element in a certain rotational direction.

With the blocking element arranged axially between the drive input element and the drive output element, a spring preferably presses the two clamping rings against one another. Alternatively, the clamping rings themselves may be of resilient design, such that no special spring is required. This applies in particular in the case of an arrangement of the clamping rings in a gap space formed radially between the drive input element and the drive output element.

According to one advantageous refinement, a trailing ring is arranged between a clamping ring and the drive output element, which trailing ring is designed to lift the clamping ring up from the drive output element completely when the drive output element is freewheeling. In this way, clanking noises, as are otherwise typical with ratchet or pawl freewheels, are prevented during overrunning operation.

The overrunning clutch is particularly suitable for use in a torque converter or in an automatic transmission.

An exemplary embodiment of the invention is explained in more detail below on the basis of a drawing, in which:

BRIEF DESCRIPTION OF THE DRAWING

FIG. 3 shows the overrunning clutch in the freewheeling state.

DETAILED DESCRIPTION OF THE DRAWING

Figure 1:
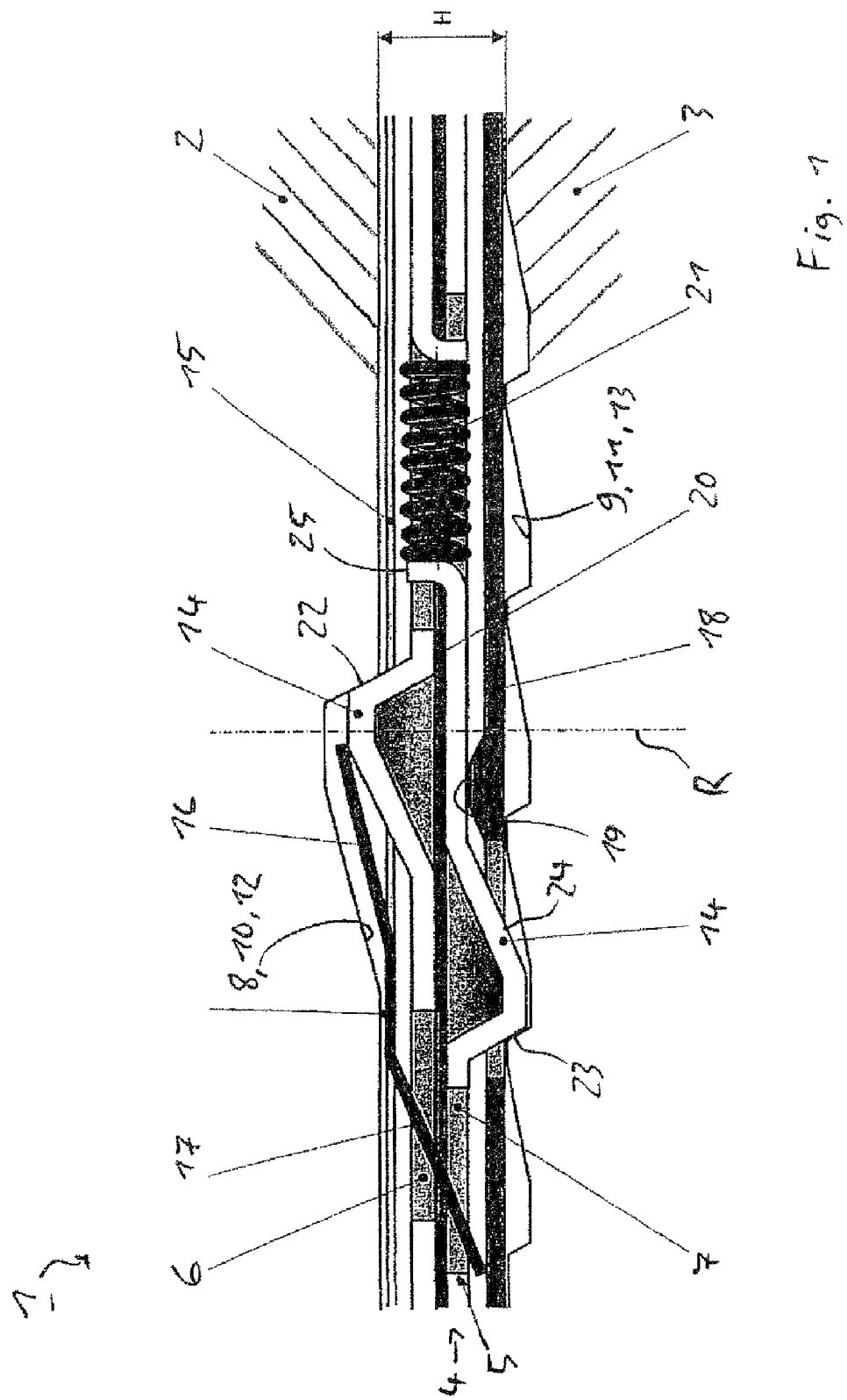
FIG. 1 shows a detail of a damped, positively locking overrunning clutch in a sectional illustration.

A positively locking overrunning clutch, which is denoted overall by the reference numeral 1 and which is also referred to as a pawl freewheel, has an axis of rotation denoted by R. With regard to the basic function of the overrunning clutch 1, reference is made to the prior art cited in the introduction, and to the German patent application 10 2007 029 812.0.

A gap space 4 with a height H is formed between a drive input element 2 and a drive output element 3 of the overrunning clutch 1, in which gap space 4 is arranged a blocking element 5. The blocking element 5 comprises two clamping rings 6, 7 which are pivotable relative to one another to a limited extent. The drive input element 2 provides an inner clamping track 8 which interacts with the blocking element 5, while the drive output element 3 provides an outer clamping track 9 which likewise interacts with the blocking element 5 and which is connected to the guide wheel of a torque converter, or is formed in one piece with such a guide wheel. The inner clamping track 8 and the outer clamping track 9 have latching structures 10, 11, with respective latching depressions 12, 13 being provided into which clamping structures 14 of the clamping rings 6, 7 engage. Here, the clamping structures 14 are integral constituent parts of the clamping rings 6, 7 which are produced economically as sheet-metal parts shaped in a non-cutting process.

An annular-disk-shaped spring 15 is arranged between the drive input element 2 and the clamping ring 6, which spring 15 has spring tongues 16, 17, with the spring tongues 16 pressing the clamping ring 6, and therefore the entire blocking element 5, in the direction of the drive output element 3. A trailing ring 18 is arranged between the clamping ring 7 and the drive output element 3, which trailing ring 18 firstly bears against the clamping ring 7 and secondly is also pressed directly against the outer clamping track 9, specifically by the spring tongues 17. The trailing ring 18 bears not over the entire area, but rather only with elevations 19, against the clamping ring 7. A friction lining 20 which serves to provide damping of the overrunning clutch 1 is arranged between the clamping rings 6, 7, which friction lining 20 may either be connected to one of the clamping rings 6, 7 or formed as a separate component. In order to permit a damped, resiliently elastic pivoting movement between the clamping rings 6, 7, the clamping rings 6, 7 are coupled to one another by means of at least one, preferably a plurality of circumferentially distributed spring elements 21 which run in the tangential direction and are embodied as helical springs.

Figure 2:
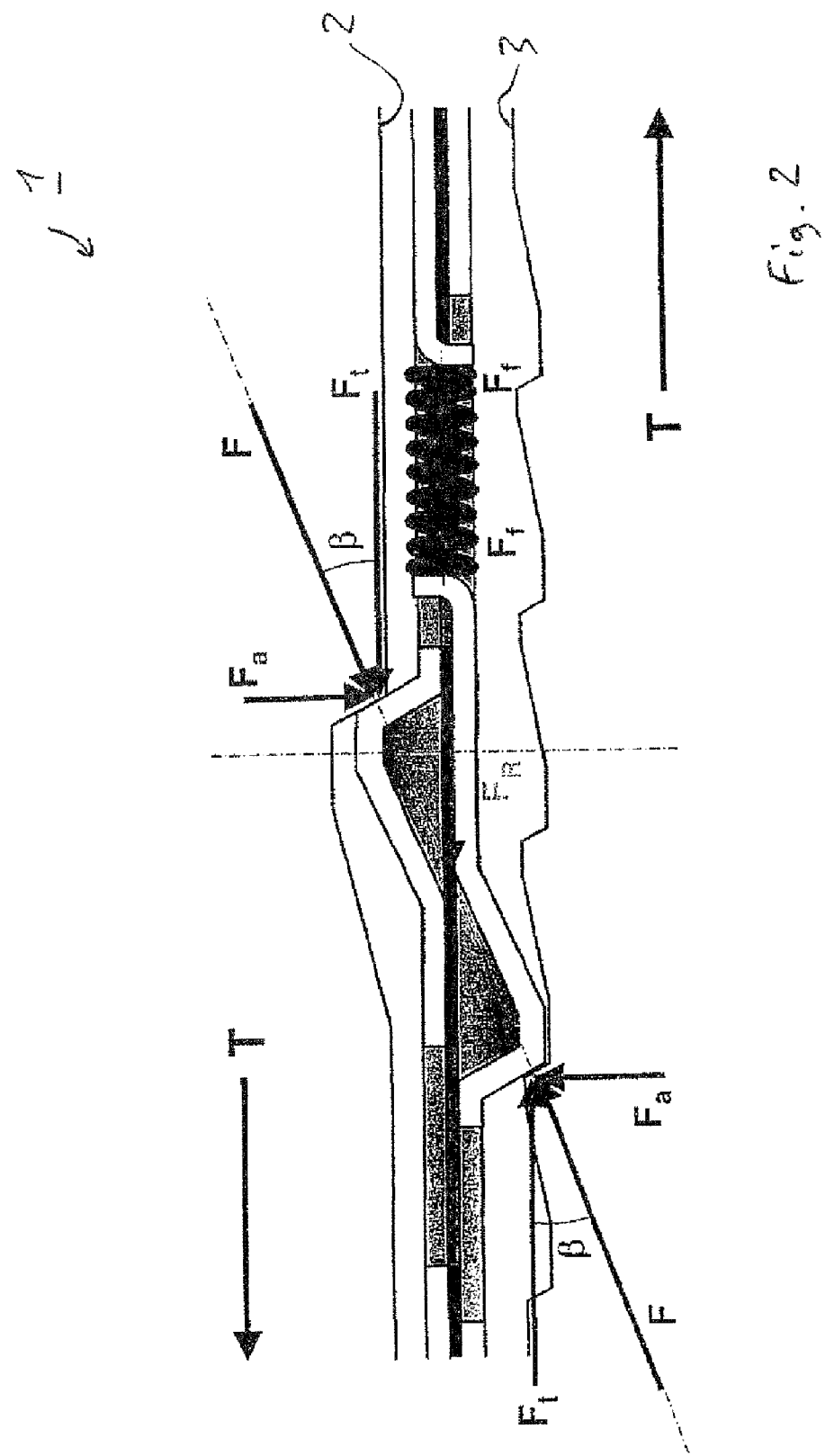
FIG. 2 shows the overrunning clutch, illustrating forces which act in the blocking state.

In FIG. 2, the trailing ring 18 and the spring 15 are not illustrated for clarity. The overrunning clutch 1 is illustrated in the blocking-ready position, as in FIG. 1. A rotation of the drive output element 3 relative to the drive input element 2 is prevented here if tangential forces in the translation direction T act on the illustrated circumferential sections of the elements 2, 3. When the overrunning clutch 1 is blocked, forces F act between blocking surfaces 22, 23, which are formed on the clamping structures 14, and the drive input element 2 or drive output element 3 respectively. The force F is composed, in each case, of an axial force $F_a$ which acts parallel to the axis of rotation R and a tangential force $F_t$ which acts orthogonally with respect to said axis of rotation R. An angle β of 10° to 30° is enclosed between the tangential direction and the direction in which the force F acts. A surface normal of the blocking surfaces 22, 23 therefore encloses an angle of 60° to 80° with the axis of rotation R. The force which is transmitted between the clamping rings 6, 7 by the spring element 21 and which acts in the tangential direction is denoted by $F_f$.

FIG. 3 illustrates the overrunning clutch 1 in the freewheeling position. Here, in the illustrated arrangement, by way of example, the visible section of the drive output element 3 has been moved to the left, while the drive input element 2 is immovable. As a result of the movement of the drive output element 3, the trailing ring 18 is pivoted until it comes into contact with the clamping structure 14 of the clamping ring 7 and forces the latter out of the latching depressions 13 in the direction of the stationary drive input element 2. During the process of the axial displacement of the clamping ring 7 and therefore of the entire blocking element 5, the trailing ring 18 abuts against a control surface 24 of the clamping ring 7. A surface normal of the control surface 24 encloses a smaller angle with the axis of rotation R than the surface normal of the blocking surface 23. Therefore, the blocking element 5 is raised up from the outer clamping track 9 in the event of a low braking torque acting between the drive output element 3 and the drive input element 2. In the state in which it is raised up from the drive output element 3, that is to say in freewheeling operation of the overrunning clutch 1, the spring element 21 is expanded to a maximum extent, with a retaining section 25, which is bent at right angles to the plane which is defined by the friction lining 20 and is normal to the axis of rotation R, of the clamping ring 7 forming a stop both for the spring element 21 and also for the clamping ring 6. During the transition from freewheeling operation into the blocked state of the overrunning clutch 1, the spring element 21 which is designed as a pressure spring is compressed, with energy being absorbed by the friction lining 20.

LIST OF REFERENCE SYMBOLS

1 Overrunning clutch
2 Drive input element
3 Drive output element
4 Gap space
5 Blocking element
6 Clamping ring
7 Clamping ring
8 Inner clamping track
9 Outer clamping track
10 Latching structure
11 Latching structure
12 Latching depression
13 Latching depression
14 Clamping structure
15 Spring
16 Spring tongue
17 Spring tongue
18 Trailing ring
19 Elevation
20 Friction lining
21 Spring element
22 Blocking surface
23 Blocking surface
24 Control surface
25 Retaining section
β Angle
F Force
$F_a$ Axial Force
$F_f$ Spring force
$F_R$ Friction force
$F_t$ Tangential force
H Height
R Rotational axis
T Translation direction

The invention claimed is:

1. A positively locking overrunning clutch, comprising:
   a damping device;
   a drive input element;
   a drive output element, the drive input element and the drive output element being rotatable about a rotational axis; and
   at least one blocking element which blocks a rotation of the drive output element relative to the drive input element in a first rotational direction and enables a rotation in an opposite rotational direction,
   wherein the blocking element has two clamping rings, a first clamping ring and a second clamping ring, which are pivotable relative to one another and damped with respect to one another,
   wherein the first clamping ring has a first end extending perpendicular to the rotational axis and a second end, which is bent at a right angle, extending parallel to the rotational axis,
   wherein the second clamping ring has a first end extending perpendicular to the rotational axis and a second end extending perpendicular to the rotational axis, and
   wherein the second end of first clamping ring and the second end of the second clamping ring are directly contactable with each other.

2. The overrunning clutch of claim 1, further comprising a spring element which acts between the clamping rings.

3. The overrunning clutch of claim 2, wherein the spring element extends in a tangential direction of the drive input element and the drive output element.

4. The overrunning clutch of claim 2, wherein the spring element is a helical spring.

5. The overrunning clutch of claim 1, wherein the clamping rings have inner sides which face toward one another and between which frictional contact is generated, and structured outer sides which interact with latching structures of the drive input element and the drive output element, respectively.

6. The overrunning clutch of claim 5, wherein blocking surfaces, which are aligned obliquely relative to the rotational axis of the drive input element and the drive output element, are formed on the outer sides of the clamping rings.

7. The overrunning clutch of claim 6, wherein a surface normal of the blocking surfaces encloses an angle of more than 60° and less than 80° with the rotational axis.

8. The overrunning clutch of claim 1, further comprising a spring which presses the clamping rings against one another in an axial direction.

9. The overrunning clutch of claim 1, further comprising a trailing ring, which is arranged between the second clamping ring and the drive output element and which lifts the second clamping up from the drive output element completely when the drive output element is freewheeling.

10. The overrunning clutch of claim 1, wherein the clamping rings are formed as sheet-metal parts shaped in a non-cutting process.

* * * * *